(12) United States Patent
Schwartz et al.

(10) Patent No.: US 9,529,828 B1
(45) Date of Patent: Dec. 27, 2016

(54) AUTOMATING CONFIGURATION AND MIGRATING CONFIGURATIONS OF ASSETS IN A STORAGE AREA NETWORK

(71) Applicant: EMC Corporation, Hopkinton, MA (US)

(72) Inventors: Michael Schwartz, Hamden, CT (US); Jody Hay, Buford, GA (US); Karen Murphy, Cork (IE); Fergal Gunn, Cork (IE)

(73) Assignee: EMC IP Holding Company LLC, Hopkinton, MA (US)

( * ) Notice: Subject to any disclaimer, the term of this patent is extended or adjusted under 35 U.S.C. 154(b) by 265 days.

(21) Appl. No.: 14/140,132

(22) Filed: Dec. 24, 2013

(51) Int. Cl.
  *G06F 7/00* (2006.01)
  *G06F 17/30* (2006.01)
(52) U.S. Cl.
  CPC .................... *G06F 17/303* (2013.01)
(58) Field of Classification Search
  CPC G06F 3/0647; G06F 17/30079; G06F 3/0629; G06F 9/445; G06F 11/2069; G06F 11/2247; G06F 15/7871; G06F 17/303
  USPC .................. 707/639, 659, 801, 634, 999.006
  See application file for complete search history.

(56) References Cited

U.S. PATENT DOCUMENTS

| | | | | |
|---|---|---|---|---|
| 6,834,299 B1* | 12/2004 | Hamilton, II | ............ | H04L 29/06 370/411 |
| 7,805,721 B2* | 9/2010 | Feinleib | ................ | G06F 9/4451 717/174 |
| 7,849,262 B1* | 12/2010 | Glade | ................... | G06F 3/0607 709/218 |
| 2007/0038679 A1* | 2/2007 | Ramkumar | ........... | H04L 41/082 |
| 2008/0243921 A1* | 10/2008 | Ellisor | ............ | G06Q 10/06375 |
| 2009/0177878 A1* | 7/2009 | Gao | ..................... | H04L 67/1097 713/100 |
| 2011/0022711 A1* | 1/2011 | Cohn | .................... | G06F 9/5061 709/225 |
| 2011/0107327 A1* | 5/2011 | Barkie | ...................... | G06F 8/63 717/176 |
| 2011/0209156 A1* | 8/2011 | Box | ....................... | G06F 9/5077 718/104 |
| 2013/0073731 A1* | 3/2013 | Bose | ..................... | G06F 9/5088 709/226 |
| 2014/0019974 A1* | 1/2014 | Siu | ........................ | G06F 9/4856 718/1 |

OTHER PUBLICATIONS

P. Mell et al., "The NIST Definition of Cloud Computing," U.S. Department of Commerce, Computer Security Division, National Institute of Standards and Technology, Special Publication 800-145, Sep. 2011, 7 pages.

\* cited by examiner

*Primary Examiner* — Mohammed R Uddin
(74) *Attorney, Agent, or Firm* — Ryan, Mason & Lewis, LLP

(57) ABSTRACT

Techniques for automating configuration and migrating configurations of assets in a storage area network (SAN). For example, a method comprises the following steps. An element representing an event in a project is generated. One or more assets are added to the element. A group within the element including a sub-set of the one or more assets from the element is generated, wherein the one or more assets in the sub-set are to be configured.

20 Claims, 11 Drawing Sheets

402

403

402

AUTOMATING CONFIGURATION AND MIGRATING CONFIGURATIONS OF ASSETS IN A STORAGE AREA NETWORK

FIELD

The field relates generally to data storage systems, and more particularly to techniques for automating configuration and migrating configurations of assets in a storage area network (SAN).

BACKGROUND

Migration planning and operations for a data storage system involve coordination of a significant amount of asset reconfiguration/configuration activities and configuration migrations. Event windows used in migration planning include a collection of migration events in a particular time frame and using particular assets. An event window can contain multiple point in time snapshots. A "snapshot" is a representation of a state of a system at a particular point in time.

The use of event windows and snapshots in migration planning operations facilitates the planning of a data storage system as the system goes through different states during a set of configuration changes. It is to be understood that a data storage system may be part of a datacenter. Event windows and snapshots allow an administrator of the datacenter to update the configuration of the data storage system at multiple points in time. The ability to simulate a change to a representation of the datacenter (or data storage center) is referred to as modeling, while actually implementing a change to the datacenter is referred to as migration. For example, an administrator can model what a datacenter would look like given a proposed change to certain resources of a data storage system, while the actual implementation of the resource change would be considered a migration.

When planning a migration, known processes for making configuration changes typically require a user to manually plan configuration changes, resulting in increased time completing the planning, and a higher risk of user error for every manual step a user performs.

Event windows provide mechanisms to plan the processes for the configuration changes. However, there is a need for improvement of the event windows to automate configuration changes, so as to reduce the number of manual processes performed by a user, resulting in improved planning and migration, and a reduction in the time and errors when completing the required planning and configuration changes.

SUMMARY

Embodiments of the invention provide techniques for automating configuration and migrating configurations of assets in a storage area network (SAN).

For example, in one embodiment, a method comprises the following steps. An element representing an event in a project is generated. One or more assets are added to the element. A group within the element including a sub-set of the one or more assets from the element is generated, wherein the one or more assets in the sub-set are to be configured.

In another embodiment, a computer program product is provided which comprises a processor-readable storage medium having encoded therein executable code of one or more software programs. The one or more software programs when executed by a processor device implement steps of the above-described method.

In yet another embodiment, an apparatus comprises a memory and a processor operatively coupled to the memory and configured to perform steps of the above-described method.

Advantageously, the embodiments of the present invention provide techniques for automating configuring of assets and migrating configurations of assets in a SAN environment. When configuring and/or migrating there are a significant amount of configurations required in a target asset. There may also be some or a significant amount of configurations required at a source asset. The embodiments of the present invention aim to simplify the process and the time it takes to plan configuration changes required when a user wants a configuration on a target asset based on existing configurations on the source asset.

These and other features and advantages of the present invention will become more readily apparent from the accompanying drawings and the following detailed description.

DETAILED DESCRIPTION

Embodiments of the present invention will be described herein with reference to exemplary computing systems and data storage systems and associated servers, computers, storage units and devices and other processing devices. It is to be appreciated, however, that embodiments of the invention are not restricted to use with the particular illustrative system and device configurations shown. Moreover, the phrases "computing system" and "data storage system" as used herein are intended to be broadly construed, so as to encompass, for example, private or public cloud computing or storage systems, as well as other types of systems comprising distributed virtual infrastructure. However, a given embodiment may more generally comprise any arrangement of one or more processing devices.

As used herein, the term "cloud" refers to a collective computing infrastructure that implements a cloud computing paradigm. For example, as per the National Institute of Standards and Technology (NIST Special Publication No. 800-145), cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction.

Figure 1:
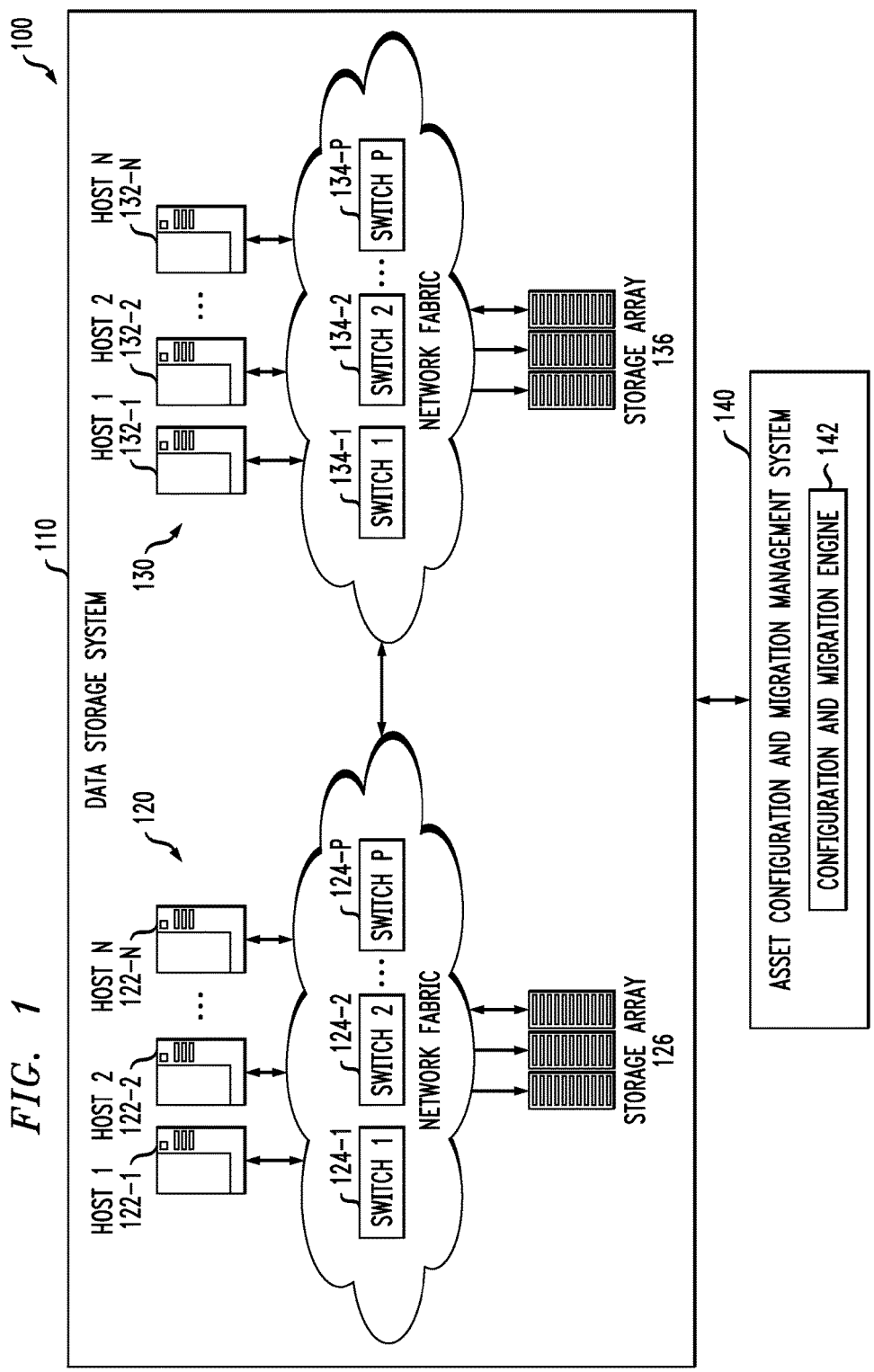
FIG. 1 shows a data storage environment with an asset configuration and migration management system according to an embodiment of the invention.

FIG. 1 shows a data storage environment with storage array replication according to an embodiment of the invention. As shown in data storage environment 100 in FIG. 1, a data storage system 110 includes a first data storage subsystem 120 and a second data storage subsystem 130. The first data storage subsystem 120, as shown, includes a plurality of host computing devices 122-1, 122-2, . . . , 122-N, a plurality of switches 124-1, 124-2, . . . , 124-P implemented as part of a network fabric (e.g., Fibre Channel fabric), and at least one storage array 126. Similarly, the second data storage subsystem 130, as shown, includes a plurality of host computing devices 132-1, 132-2, . . . , 132-N, a plurality of switches 134-1, 134-2, . . . , 134-P implemented as part of a network fabric (again, e.g., Fibre Channel fabric), and at least one storage array 136.

It is to be appreciated that while the data storage system 110 illustrates two data storage subsystems, system 110 may include a larger or smaller number of subsystems. Also, it is to be understood that while execution components shown in each subsystem include hosts, switches, fabric, and storage arrays, one or more of the subsystems may include additional execution components not expressly shown. For example, when the data storage system 110 is implemented as part of a distributed virtual infrastructure, each host may have associated therewith one or more virtual machines (VMs), while each storage array may have associated therewith one or more logical units (or logical unit numbers) (LUNs). Thus, each subsystem can have both logical execution components and physical execution components. Also, it is to be understood that each storage array may have one or more physical storage devices associated therewith.

Also shown in system environment 100 is an asset configuration and migration management system 140. The management system 140 is a computer-based tool used by administrators of the data storage system 110 to plan automate asset configurations and migration of asset configurations within the data storage system. Data can be, for example, acquired, distributed, and/or migrated from storage array 126 in subsystem 120 to storage array 136 in subsystem 130, or vice versa. Also, data may need to be acquired, distributed and/or migrated from one storage array to another storage array, from one asset to another asset, from a storage system to a VPLEX®, from one VPLEX® to another VPLEX®, and/or from a VPLEX® to a storage system within the same subsystem or between subsystems. Reasons for the data acquisition, distribution and/or migration are application-dependent, but could be driven by data and resource management decisions made by the infrastructure provider.

The management system 140 includes configuration and migration engine 142, which controls asset configurations and migration of asset configurations within the data storage system in the data storage system 110.

As used herein, "configuration" of an asset, "asset configuration" and "configure" can refer to an original configuration of an asset (e.g., initially configuring an asset) or a reconfiguration of an asset (e.g., reconfiguring an asset that was previously configured).

As used herein, an asset includes, but is not limited to, a host, switch, fabric, array, VPLEX® software and hardware, etc. In accordance with embodiments of the present invention, the configuration and migration can be performed: (1) within a single asset, e.g., by creating local replica for a range of devices, and migrating thick devices to thin devices; (2) between two assets, e.g., the assignment of devices from one host to another host, and replacing an existing switch with a new switch; (3) from one to a plurality of assets, e.g., by creating multiple remote replica for a particular device, and replacing an existing switch which has a single fabric with multiple switches with failover zones; (4) from a plurality of assets to one asset, e.g., by migrating two switches to one switch, and migrating devices from multiple arrays to a single VPLEX®; and/or (5) from a plurality of assets to a plurality of assets.

As used herein a "source asset" refers to one or more source assets that contain an initial configuration. As used herein a "target asset" refers to one or more target assets on which new configurations are being created. In accordance with an embodiment, a source asset and a target asset can be the same asset.

As used herein, VPLEX® refers to virtual storage technology that enables applications to remain up and running during any of a variety of planned and unplanned downtime scenarios. For example, VPLEX® permits data movement, taking technologies and other clusters that were built assuming a single storage instance and enabling them to function across arrays and across distance. VPLEX® is commercially available from EMC Corporation of Hopkinton, Mass.

Advantageously, embodiments of the present invention provide techniques for automating configuring of assets and migrating configurations of assets in a SAN environment. When configuring and/or migrating there are a significant amount of configurations required in a target asset. There may also some or a significant amount of configurations required at a source asset. The embodiments of the present invention aim to simplify the process and the time it takes to plan configuration changes required when a user wants a configuration on a target asset based on existing configurations on the source asset. Embodiments of the present invention also provide techniques for the generation of scripts. In accordance with embodiments of the present invention, scripts can be automatically generated to update configurations on source environments, target environments, and other assets/sub-assets where changes are required as a result of the configuration and migration.

In accordance with embodiments of the present invention, source and target assets are grouped together so their configurations can be managed as a unit. Embodiments of the invention contemplate multiple types of grouping. For purposes of explanation and not limitation, examples illustrating embodiments of the present invention are described in connection with event windows and migration groups.

As used herein, a project refers to a real-life migration project. Each project contains one or more event windows.

As used herein, an event window contains all source and target assets that are being configured/reconfigured, e.g., source array/target array, source switch/target switch, source arrays/target arrays, VPLEX®, etc. In accordance with embodiments, associated assets can also be part of an event window, e.g., hosts, switches, arrays, VPLEX®, etc. An event window (or migration window) can further include a collection of migration events that share the same time window and asset configuration. An event window can contain multiple migration groups and point in time snapshots. In accordance with an embodiment, an event window starts at a specific date and has a fixed end date. For example, an event window may represent a particular weekend.

As used herein, a migration group refers to a group of assets and associated configurations that will be/are migrated, e.g., hosts and associated array devices. More specifically, a migration group contains a subset of source and target assets that are in an event window. Migration may occur within a particular asset or between assets and there can be multiple migration groups in an event window.

One or more profiles of assets can be included in a migration group, which examine the details, configurations and/or rules associated with assets/sub-assets that are included as source and target. Non-limiting examples of profiles in a migration group include: (1) source devices that are masked to a particular host; (2) source devices that have existing local or remote replication; (3) type of replication that is planned to use to migrate between the source and target assets, e.g., Open Replicator, SAN Copy, Symmetrix® Remote Data Facility (SRDF®); (4) rules to select only assets that are associated to another asset, e.g., hosts that are visible in a particular fabric, devices that are connected to a particular clustered host; (5) devices that have a local replication associated to them; and/or (6) rules to only permit the addition of target assets that have the resources available in order to automatically migrate and/or reconfigure the source asset.

As used herein, a snapshot refers to a point in time description of the state of all elements, for example, a point in time representation of a data storage system. A snapshot may include a set of planned configuration changes. In accordance with embodiments of the present invention, examples of snapshots are migration state, production state and current state snapshots. Snapshots can contain a complete copy of information in connection with an environment or just sufficient information to represent the environment at different points in time.

In accordance with an embodiment of the present invention, an asset is not visible in an event window if it is not specifically added to the event window, e.g., if a device is masked to two hosts, it will not be possible view host information in the event window unless the host is added to the event window. It is not, however, necessary to add the host to the migration group because the migration group uses an array device to detect what should be migrated.

In accordance with embodiments of the present invention, rules are executed against an event window and migration groups to inform the user of errors, warnings and information messages about the environment where the configuration and migration is taking place. Some non-limiting examples of messages that can be generated include: an additional SRDF® path is required to keep the environment fault tolerant; and/or zoning is required between SRDF® director ports to replicate between source and target. In addition, reports can be generated to document the environment before, during and after the configuration changes. These reports can be used for project management or during the implementation of a migration.

In accordance with embodiments of the present invention, a user can manually override a selection within a migration group to exclude particular sub-elements, for example, 100 devices exist on an array, and a user can manually exclude a number of the devices (e.g., 5 devices) in the migration group.

Figure 2:
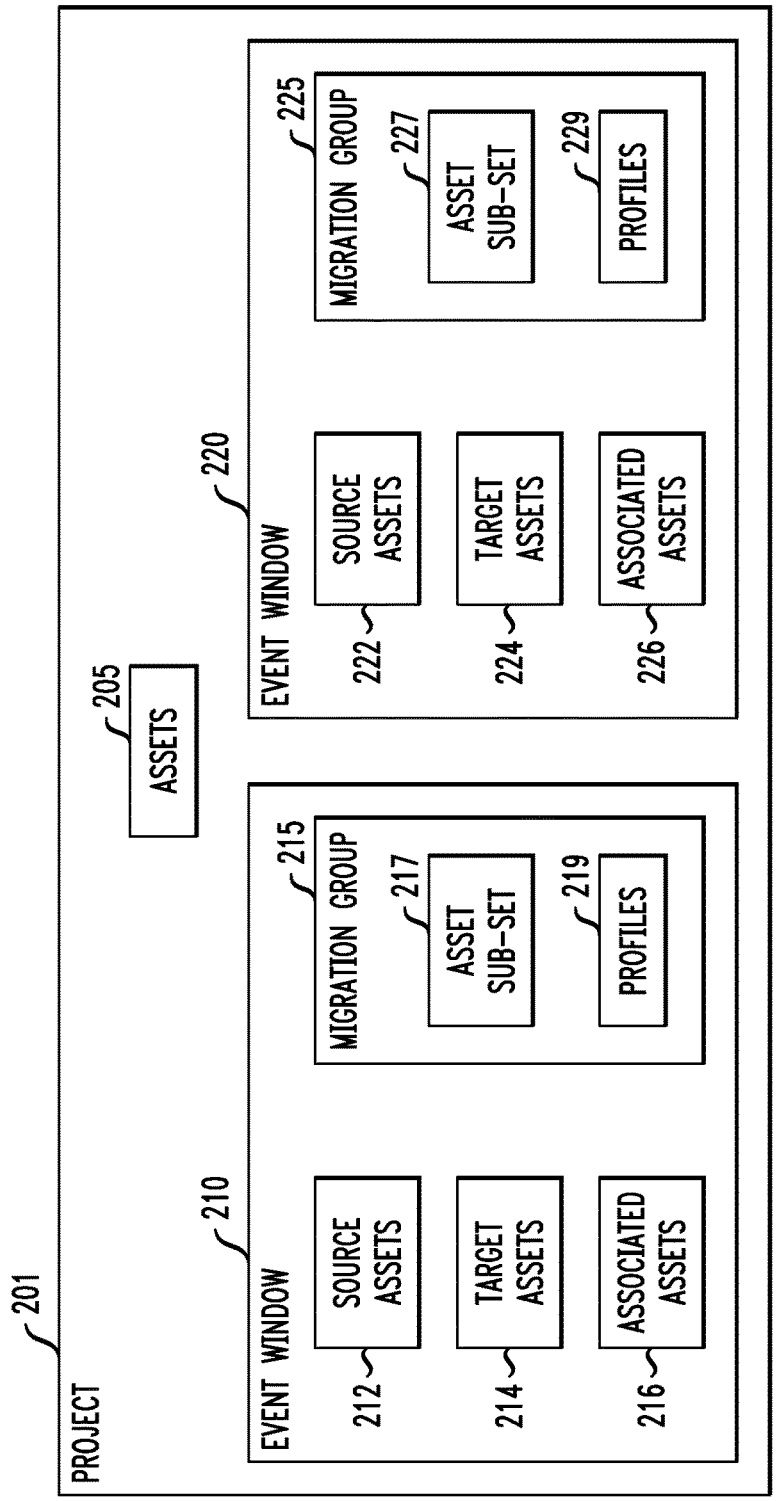
FIG. 2 shows an asset configuration and migration management system according to an embodiment of the invention.

FIG. 2 shows an asset configuration and migration management system 200 according to an embodiment of the invention. The system 200 includes a project 201 including assets 205 and a plurality of event windows 210 and 220. The project assets 205 are stored in a snapshot. It is to be understood that the number of event windows is for purposes of illustration, and that there may be more or less event windows. As can be seen, each event window includes source assets 212, 222 and target assets 214, 224 that are being configured/reconfigured and associated assets 216, 226. The source assets, target assets and associated assets are stored in one or more snapshots in an event window. The event windows 210, 220 further include migration groups 215, 225. It is to be understood that the number of migration groups is for purposes of illustration, and that there can be multiple migration groups in an event window. In accordance with an embodiment of the present invention, the migration groups each include an asset sub-set 217, 227 and profiles 219, 229.

In the examples applying the embodiments of the present invention set forth below in FIGS. 3A-3D, 4A-4B, 5, 6A-6B, 7 and 8, automatic assignments are created using the available resources in an event window. If sufficient resources are not available, then resources will have to be freed up before executing a plan. Alternatively, a policy is put in place to specify when resources can be re-used. In some examples, migration groups do not always list target sub-assets, e.g., Example 1 does not list the target devices in some of the diagrams. This is because a migration group represents a state before the target devices are automatically assigned.

It is to be understood that although embodiments of the present invention are described herein in the context of storage area networks (SANs), the embodiments are not necessarily limited thereto, and may be used in other scenarios.

Figure 3A:
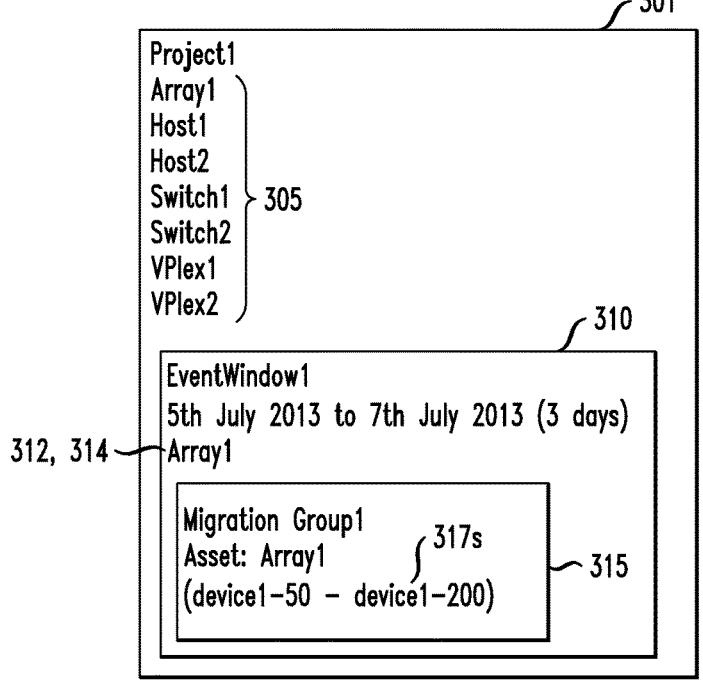
FIG. 3A illustrates an event window and migration group in connection with creating local replicas for devices in accordance with an embodiment of the present invention.

FIG. 3A illustrates an event window and migration group in connection with creating local replicas for devices in accordance with an embodiment of the present invention. The non-limiting example (Example 1) described in connection with FIGS. 3A-3D corresponds to creating local replicas for devices (device1-50-device1-200) in Array1. In this particular application of an embodiment of the present invention, it is known in advance (e.g., by a user, processor, etc.) that devices (device1-50-device1-200) are the devices for which it is desired to create local replicas and automatic detection of the source assets is not required. The creation of the local replicas requires changes that are local to Array1. As a result, from the assets 305 of project 301, only Array1 is added to EventWindow1 310 as both the source and target asset 312, 314, and to MigrationGroup1 315. Other assets, however, could be added to EventWindow1 310, for example, as associated assets, so that a user would be able to view how the devices (device1-50-device1-200) are associated to other assets in the environment. Using devices (device1-50-device1-200) as an input, snapshot devices are automatically created. The snapshot devices are typically created from a device pool. The device pool is storage capacity that is available for all devices that are created on it. In accordance with an embodiment of the present invention, each snapshot device is created from the device pool with an initial capacity assigned. The snapshot device's actual capacity is reserved but not allocated until it is required. The device pool can be automatically selected from an existing pool or a new pool can be automatically created and used. In FIG. 3A, devices (device1-50-device1-200) are source sub-assets 317s because the MigrationGroup1 315 represents a state before the target devices are automatically assigned. Target devices (device1-550-device1-700) would be added to MigrationGroup1 315 once they are automatically created.

In this example, the source devices are not being automatically determined. It is however possible to do this by adding a host (e.g., Host1) to a migration group (e.g., MigrationGroup1) and automatically including all devices in an array (e.g., Array1) that are masked to the host (e.g., Host1).

Figure 3B:
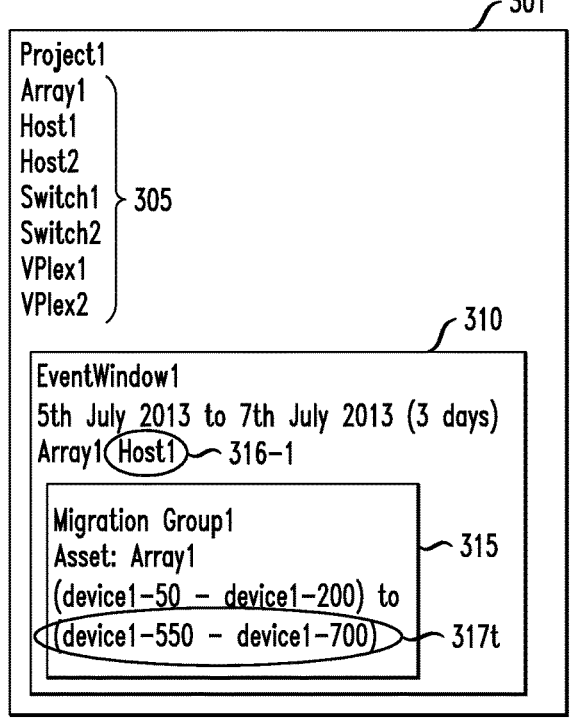
FIG. 3B illustrates an event window and migration group in connection with creating a local replica for devices where it has been realized that the local replicas should be masked to a host in accordance with an embodiment of the present invention.

FIG. 3B illustrates an event window and migration group in connection with creating a local replica for devices where it has been realized that the local replicas should be masked to a host in accordance with an embodiment of the present invention. The non-limiting example described in connection with FIG. 3B corresponds to a situation when it is realized (e.g., by a user, processor, etc.) that the local replicas should be masked to the same ports on Host1 as the original device. Accordingly, Host1 is added to EventWindow1 310 as an associated asset 316-1. It is not necessary to add Host1 to the migration group 315 because the migration group is determined by the range of devices (device1-50-device1-200) in Array1. By adding Host1 to the EventWindow1 310, it is possible to automatically create the masking to the host for the target snapshot devices. The target sub-assets 317t, including devices (device1-550-device1-700), are now displayed in the migration group 315 because they have been automatically assigned. It is not necessary for associated assets that have been automatically created or assigned to be added to the migration group.

Figure 3C:
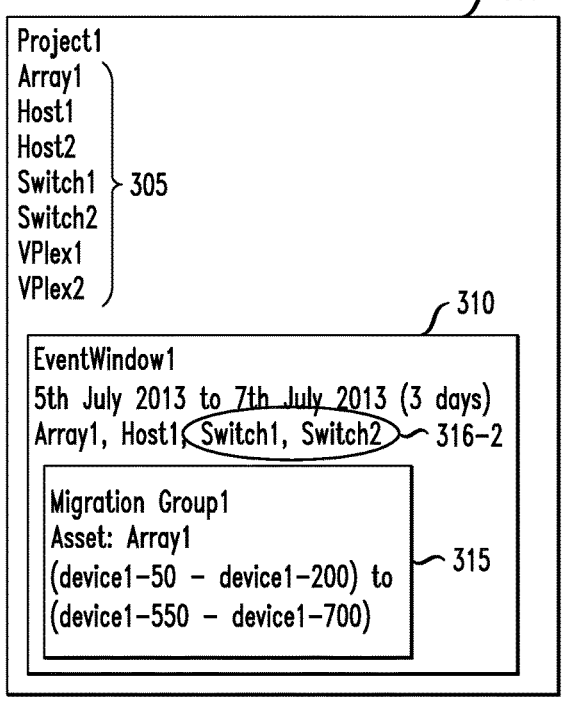
FIG. 3C illustrates an event window and migration group in connection with creating a local replica for devices where it has been decided that a switch configuration should be updated in accordance with an embodiment of the present invention.

FIG. 3C illustrates an event window and migration group in connection with creating a local replica for devices where it has been decided that a switch configuration should be updated in accordance with an embodiment of the present invention. The non-limiting example described in connection with FIG. 3C corresponds to a situation when it is determined (e.g., by a user, processor, etc.) that a switch configuration should be updated, as there are two fabrics between Host1 and Array1. Accordingly, Switch1 and Switch2 are added to EventWindow1 310 as additional associated assets 316-2. In each of the fabrics, snapshot devices in the array are zoned between the array port and the host port they are masked to. Masking is the association between the device, array port and the host port. It is not necessary to add Switch1 or Switch2 to the MigrationGroup1 315 for the same reason as not adding Host1. The switch ports that are used can be automatically detected using the existing switch ports and fabrics that are associated, e.g., switchPort1 in Switch1 is associated to arrayPort1 that is used to mask device1-50 to a port on Host1, and it is automatically detected that this switch port should be associated to the target device. It is now possible to automatically assign switch ports to fabrics and zones.

Figure 3D:
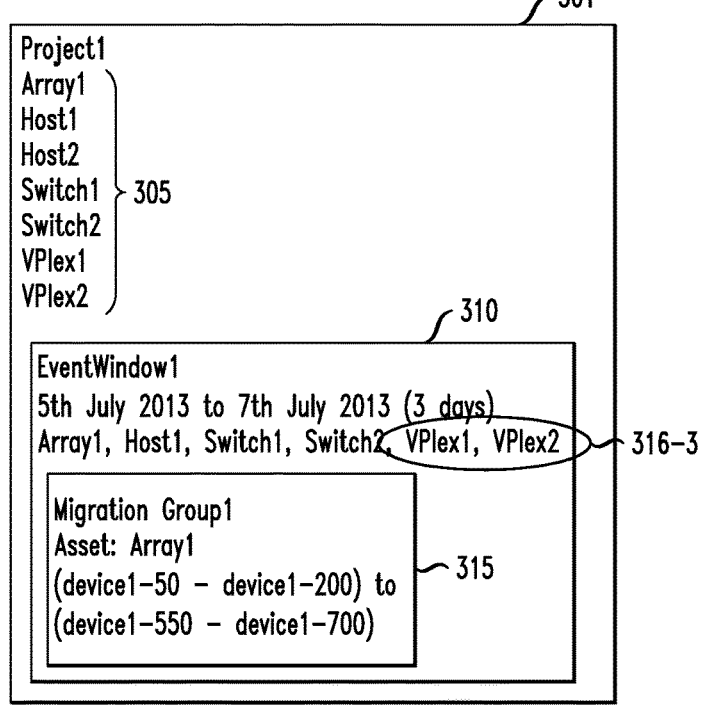
FIG. 3D illustrates an event window and migration group in connection with creating a local replica for devices where it has been decided that a further level or abstraction should be applied by adding an abstraction appliance in accordance with an embodiment of the present invention.

FIG. 3D illustrates an event window and migration group in connection with creating a local replica for devices where it has been decided that a further level or abstraction should be applied by adding an abstraction appliance in accordance with an embodiment of the present invention. The non-limiting example described in connection with FIG. 3D corresponds to a situation when it is determined (e.g., by a user, processor, etc.) that a further level or abstraction should be applied by adding an abstraction appliance, such as, for example, VPlex1 and VPlex2. Accordingly, VPlex1 and Vplex2 are added to EventWindow1 310 as additional associated assets 316-3. In accordance with an embodiment of the present invention, abstraction devices can be added to VPlex1 and VPlex2 for each snapshot device (device1-550-device1-700) on Array1 that is masked to Host1. The LUN masking between device (device1-550-device1-700) and Host1 is no longer required, instead device (device1-550-device1-700) are masked to back end ports on VPlex1 and VPlex2. VPlex1 and VPlex2 recognize the devices as storage volumes and automatically create extents for each of the storage volumes. Devices are created for each extent. Virtual volumes are created for each of these devices. As VPlex1 and VPlex2 are clustered, the storage volumes are visible on both VPLEX®, and only one extent is created for every storage volume that is visible. This can be accessed by the host from either VPlex1 or VPlex2 by adding the virtual volumes to a storage view, which also contains ports for Host1. In each of VPlex1 and VPlex2, fabric connectivity can be updated from Array1, Host1, Switch1 and Switch2. Front end ports and back end ports of VPlex1 and VPlex2 are connected to switch ports. The front end ports should be in the same fabrics as the host. The back end ports should be in the same fabrics as the array. This increases the number of fabrics required from two to four. It is now possible to automatically create abstracted devices and assign fabric connectivity.

Figure 4A:
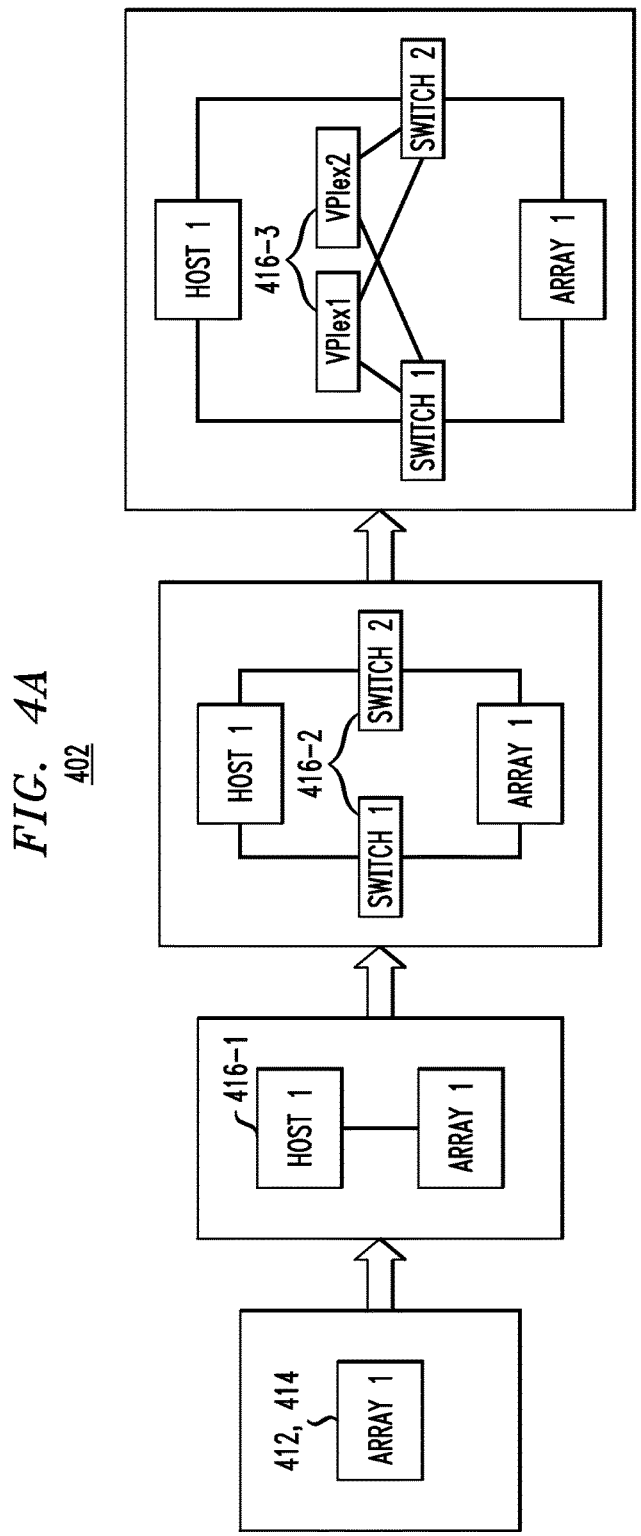
FIGS. 4A and 4B respectively illustrate the physical connectivity and logical connectivity of assets that are added to an event window, in accordance with an embodiment of the present invention.
Figure 4B:
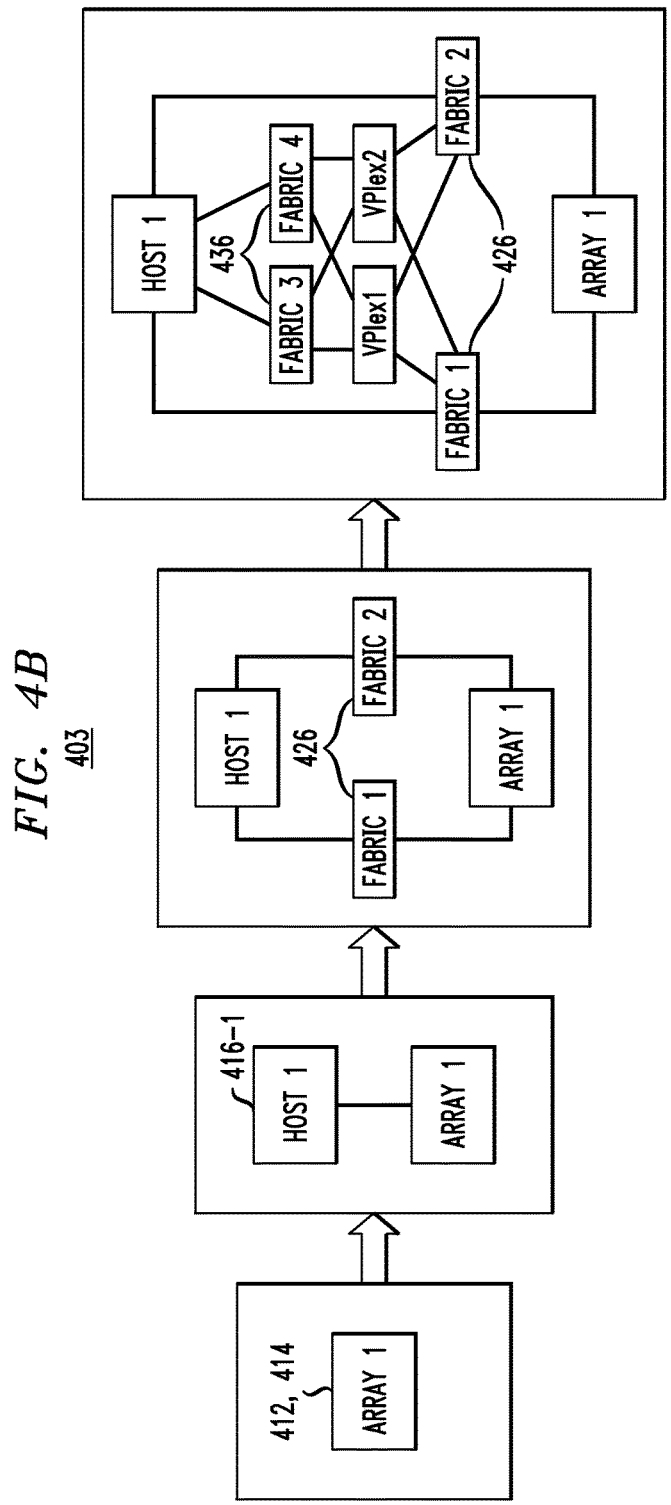

FIGS. 4A and 4B respectively illustrate the physical connectivity and logical connectivity of assets that are added to an event window, in accordance with an embodiment of the present invention. As can be seen from the physical connectivity block diagram 402, the automatic configurations are not limited to the asset that is being configured and/or migrated. For example, Host 416-1, Switch1,2 416-2 and VPlex1,2 416-3 are included in the span of automatic configurations that can be achieved. There are also other automatic configurations which could be completed for the assets that are part of EventWindow1 310 that are not listed herein, and there are also other assets that could be added to EventWindow1 310 that could increase the number of automatic configurations, e.g., a clustered host.

In accordance with embodiments of the present invention, scripts can be generated on the Host1, Array1, Switch1, Switch2, VPlex1 and VPlex2, which can be executed during implementation, and rules can be run against the automatic configurations. In addition, information, warning and errors that are detected can be reviewed by a user who may choose to take action before implementation. For example, there may be insufficient resources in one of the assets that is being used, and the user can update the configuration of this asset manually to resolve this issue. In some instances, a user may remove a subset of the sub-assets that are in the migration group or manually update a configuration of associated assets to resolve any conflicts. Alternatively, a user may also choose to ignore an error message and address same at an implementation stage. Reports can be generated based on the configuration, and used to provide instructions at implementation, and information to stakeholders at various levels.

Figure 5:
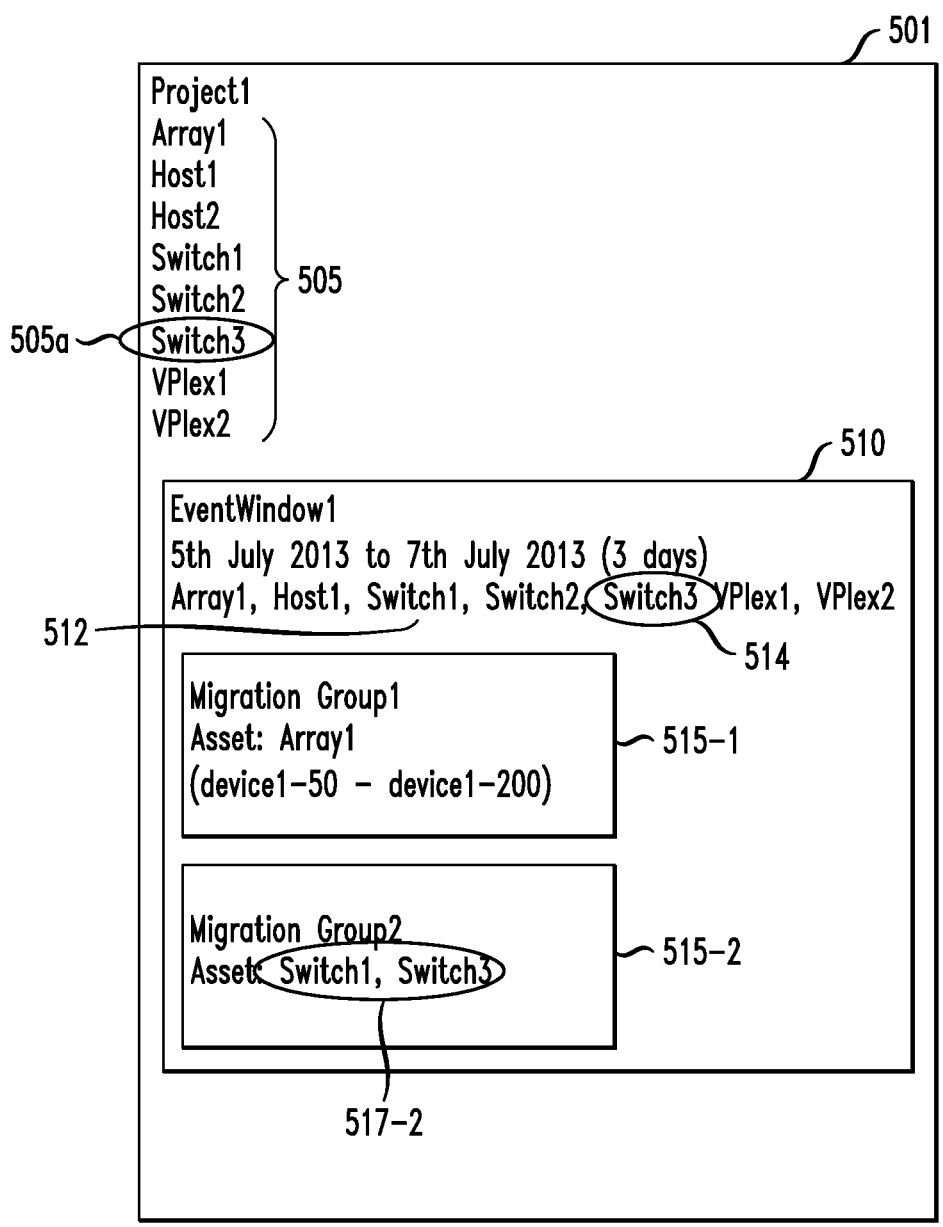
FIG. 5 illustrates an event window including replacement of a first switch with a second switch, in accordance with an embodiment of the present invention.

FIG. 5 illustrates an event window including replacement of a first switch with a second switch, in accordance with an embodiment of the present invention. The non-limiting example (Example 2) described in connection with FIG. 5 uses the final configuration from Example 1, and includes an event window and migration group configuration for replacing Switch1 with a new switch Switch3. Replacing Switch1 with a new switch Switch3 requires updating the fabric and zoning information for all ports that are being used in Switch1. Switch3 505a is imported into Project1 501, and then added to EventWindow1 510. A new migration group MigrationGroup2 515-2 is created. Switch1 and Switch3 are added to MigrationGroup2 515-2 as an asset sub-set 517-2. A user and/or a processor selects Switch1 as the source asset 512 and Switch3 as the target asset 514 for MigrationGroup2 515-2. In accordance with an embodiment of the present invention, this example could be further expanded so that only a subset of ports on the switch are migrated, e.g., automatically select ports that are connected to Array1.

The fabrics, zones and port assignments are automatically assigned on Switch3 based on what is configured in Switch1. Assuming that the connections in this non-limiting example are Array1, Host1, Switch1, Switch2, VPlex1, VPlex2, then the following physical connections are migrated: (1) Port on Switch1 that is connected to Array1; (2) Port on Switch1 that is connected to Host11; (3) Port on Switch1 that is connected to VPlex1; (4) Port on Switch1 that is connected to VPlex2. In accordance with an embodiment, as Switch1 and Switch2 are being used for fault tolerance, the ports on Switch1 that are connected to ports on Switch2 are migrated as well.

The zones and fabrics are also migrated, whereby Switch1 is removed from the fabric and Switch3 added. If Switch1 is the only switch in the fabric, it is possible to create a new fabric rather than modify the existing one.

In accordance with an embodiment of the present invention, Table 1 sets forth the creation of new zones for the following combination of ports.

TABLE 1

| 1st port in zone | 2nd port in zone |
| --- | --- |
| Port on Switch1 that is connected to Array1 | Port on Switch1 that is connected to VPlex1 |
| Port on Switch1 that is connected to Array1 | Port on Switch1 that is connected to VPlex2 |
| Port on Switch1 that is connected to Array1 | Port on Switch1 that is connected to Host1 |
| Port on Switch1 that is connected to Host1 | Port on Switch1 that is connected to VPlex1 |
| Port on Switch1 that is connected to Host1 | Port on Switch1 that is connected to VPlex2 |
| Port on Switch1 that is connected to VPlex1 | Port on Switch1 that is connected to VPlex2 |
| Port on Switch1 that is connected to Switch1 | Port on Switch1 that is connected to Switch2 |

For each zone listed in Table 1 above, there may be multiple instances for each unique pairing that currently exist. In accordance with an embodiment, it was determined (e.g., by a user, processor, etc.) to have two ports in each new zone created. Alternatively, a different policy can also be used where there are more ports in a zone.

In accordance with embodiments of the present invention, the configuration changes are automatically generated in a migration group. In addition, reports/runbooks can be created which can aid the implementation. For example, the reports/runbooks can provide instructions of physical port connection changes that should be made. Scripts can also be generated which could be used to automatically create any new fabrics/zones that are required for the environment. The scripts can be executed during implementation.

In accordance with embodiments of the present invention, when automating the migration of a configuration, it is possible to import assets as many times as is necessary. In this example it may be useful to check that the user had correctly cabled all switch ports. In accordance with the embodiments of the present invention, this check could be completed by importing updated switch information and running rules to ensure that it is possible create all zones that were planned in MigrationGroup2 515-2. Any connections that were not configured as per the plan would be identified. The user has a choice to manually update the ports connectivity or to automatically update the zones that were created as part of migration planning.

Figure 6:
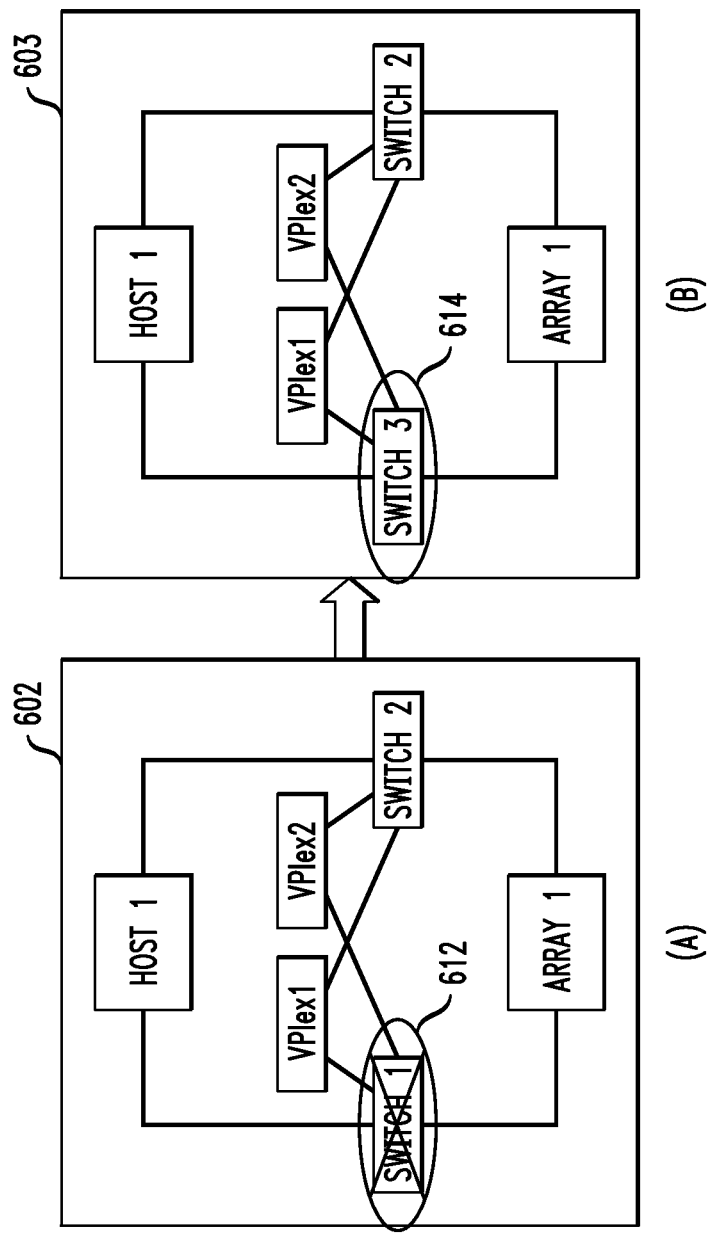
FIGS. 6A and 6B are block diagrams illustrating a comparison of connectivity of physical elements in a SAN before and after a first switch was replaced with a second switch.

FIGS. 6A and 6B are block diagrams illustrating a comparison of connectivity of physical elements in a SAN before and after Switch1 was replaced with Switch3. As can be seen, Switch1 is a source asset 612, and is replaced by Switch3, being the target asset 614. Previous redundant descriptions of the block diagram in connection with FIG. 4A have not been repeated.

Figure 7:
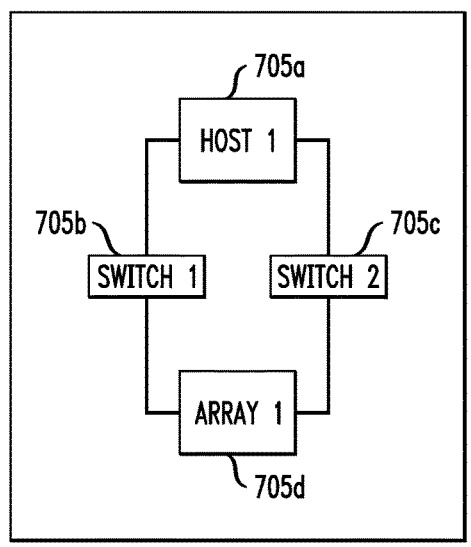
FIG. 7 illustrates an existing SAN configuration.
Figure 8:
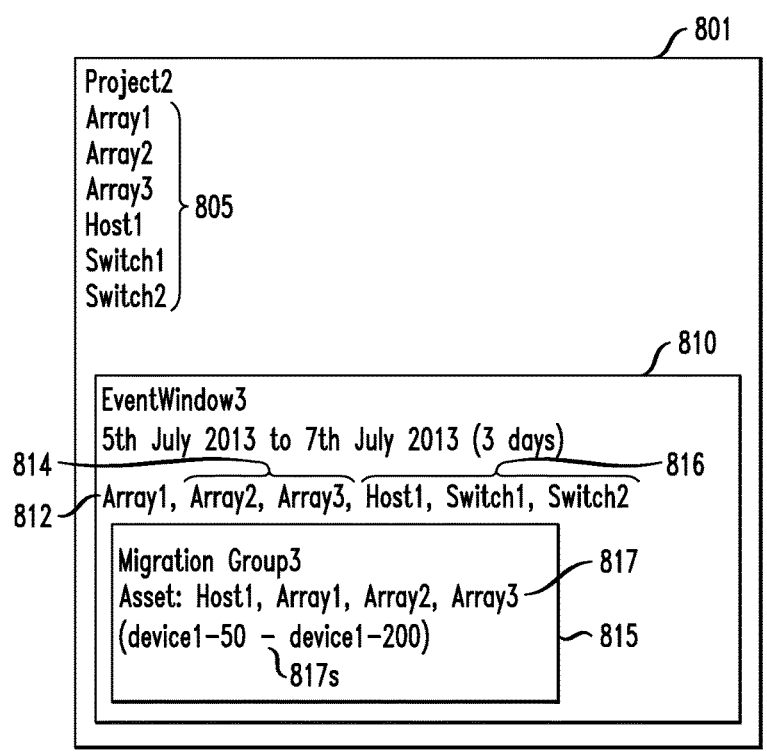
FIG. 8 illustrates an event window used in connection with the creation of multiple remote replicas on a plurality of arrays from a range of devices on a single array in accordance with an embodiment of the present invention.

Referring to FIGS. 7 and 8, the creation of multiple remote replicas on a plurality of arrays from a range of devices on a single array is explained in accordance with an embodiment of the present invention. FIG. 7 illustrates an existing SAN configuration 700 including assets Host1 705a, Switch1 705b, Switch2 705c, and Array1 705d. FIG. 8 illustrates an event window used in connection with the creation of multiple remote replicas on a plurality of arrays from a range of devices on a single array in accordance with an embodiment of the present invention. More specifically, EventWindow3 810 in FIG. 8 is used for creating multiple remote replica on Array2 and Array3 for a range of devices on Array1.

Referring to FIG. 8, a user and/or processor creates Project2 801 and EventWindow3 810 and imports assets Host1, Switch1, Switch2, Array1, Array2 and Array3 (collectively referred to by reference number 805). All assets are added to EventWindow3 810, and MigrationGroup3 815 is created. Array1 is set as a source asset 812, and Array2 and Array3 are set as target assets 814. The remaining assets in EventWindow2 can be deemed associated assets 816. MigrationGroup3 815 includes asset sub-set 817 including Array1, Array2 and Array3 and is restricted by devices in source array Array1 that are masked to Host1. In accordance with an embodiment of the present invention, Host1 is added to MigrationGroup3 as "is restricted by devices in source array Array1 that are masked to Host1" means that Host1 is required to determine the source devices. The source devices (device1-50-device1-200) 817s are automatically determined. The migration group 815 automatically determines all of the target configurations that are needed.

In accordance with an embodiment of the present invention, a non-exhaustive list of configuration changes that would be created by Project2 801 if this was an SRDF® replication is:

Create thin pool thinPool2-1 on Array2;
Create thin pool thinPool3-1 on Array3;
Create target devices (device2-300-device2-450) from thinPool2-1 on Array2;
Create target devices (device3-550-device3-700) from thinPool3-1 on Array3;
Create RA Group raGroup1-1 on Array1;
Create RA Group raGroup1-2 on Array1;
Create RA Group raGroup2-1 on Array2;
Create RA Group raGroup3-1 on Array3;
Create a remote data facility (RDF) pair between devices (device1-50-device1-200) and devices (device2-300-device2-450);
Create a RDF pair between devices (device1-50-device1-200) and devices (device3-550-device3-700);
Create zoning between ports in raGroup1-1 and raGroup2-1;
Create zoning between ports in raGroup1-1 and raGroup3-1;
Create masking between Host1 and (device2-300-device2-450) on Array2; and
Create masking between Host1 and (device3-550-device2-700) on Array3.

Planning these configuration updates manually would take a significant amount of time, and there is a high risk of user error for every manual step a user performs. Advantageously, embodiments of the present invention automatically model required configuration updates. Examples of applications of embodiments of the present invention include, but are not limited to: (1) generating scripts that can be run during implementation; (2) providing a runbook that contains a list of instructions to complete the implementation, which can be reviewed to add more instructions on procedures specific to the migration; (3) generating reports to document existing and planned configurations; and/or (4) executing rules to identify errors, warnings and information states in a SAN. These applications can be run at any stage during the automation of configuration of assets.

Figure 9:
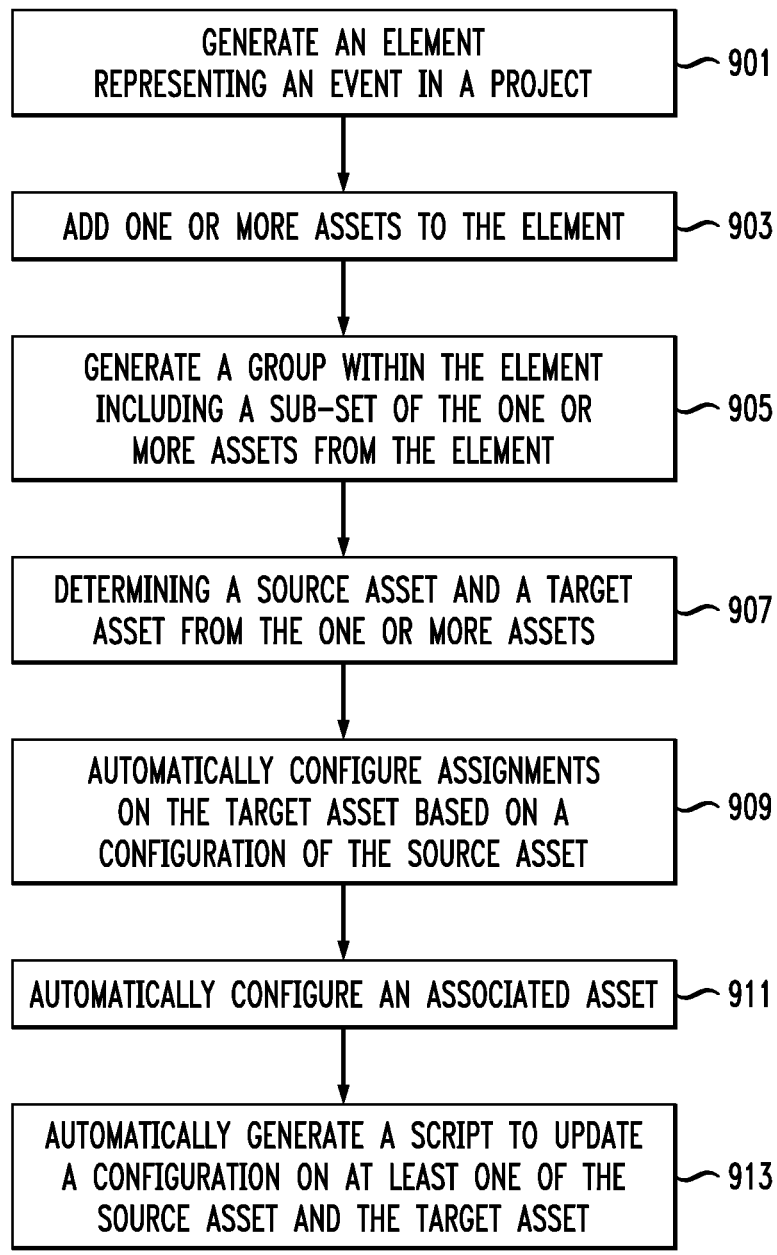
FIG. 9 is a flow chart showing a method for automating configuration and migrating configurations of assets, in accordance with an embodiment of the present invention.

FIG. 9 is a flow chart showing a method for automating configuration and migrating configurations of assets, in accordance with an embodiment of the present invention. Unless otherwise stated, the order or number of steps set forth in FIG. 9 is not necessarily limited to what is shown, and may be subject to change. It should be understood that the structure of the flow chart set forth in FIG. 9 be viewed as exemplary rather than as a requirement or limitation of the invention.

Referring to FIG. 9, the method 900 comprises, at block 901, generating an element (e.g., an event window) representing an event in a project. The method further comprises, at block 903, adding one or more assets to the element, and at block 905, generating a group (e.g., migration group) within the element including a sub-set of the one or more assets from the element. In accordance with an embodiment of the present invention, the one or more assets in the sub-set are to be reconfigured/configured in some manner.

The method may further comprise at block 907, determining a source asset and a target asset from the one or more assets, and at block 909, automatically configuring assignments on the target asset based on a configuration of the source asset.

The one or more assets can further comprise an associated asset, wherein the associated asset is included in the element (e.g., event window) and is not included in the sub-set of the one or more assets (e.g., not included in the migration group). At block 911, the method may further include automatically configuring the associated asset, wherein the automatically configuring comprises at least one of creating a masking to the associated asset and assigning a connectivity of the associated asset. At block 913, the method may further comprises automatically generating a script to update a configuration on at least one of the source asset and the target asset Configuring the one or more assets in the sub-set can be performed within a single asset, between two assets, between one asset and a plurality of assets, or from a plurality of assets to another plurality of assets. The group within the element (e.g., migration group) can include one or more profiles including device information, other entity information (e.g., switch ports, zones) information and migration constraints.

Figure 10:
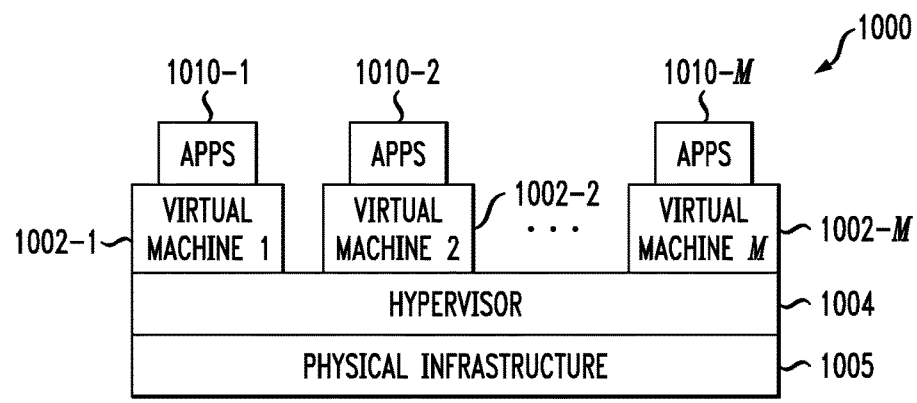
FIGS. 10 and 11 show examples of processing platforms that may be utilized to implement at least a portion of the systems of FIGS. 1 and 2.

As shown in FIG. 10, the cloud infrastructure 1000 comprises virtual machines (VMs) 1002-1, 1002-2, . . . 1002-M implemented using a hypervisor 1004. The hypervisor 1004, as mentioned above, is an example of what is more generally referred to herein as "virtualization infrastructure." The hypervisor 1004 runs on physical infrastructure 1005 (e.g., such as may include CPUs and/or storage devices). The cloud infrastructure 1000 further comprises sets of applications 1010-1, 1010-2, . . . 1010-M running on respective ones of the virtual machines 1002-1, 1002-2, . . . 1002-M (utilizing associated LUNs) under the control of the hypervisor 1004.

Although only a single hypervisor 1004 is shown in the example of FIG. 10, a given embodiment of cloud infrastructure configured in accordance with an embodiment of the invention may include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs in a manner similar to that of a physical machine. Thus, different virtual machines can run different operating systems and multiple applications on the same physical computer. Virtualization is implemented by the hypervisor 1004 which, as shown in FIG. 10, is directly inserted on top of the computer hardware in order to allocate hardware resources of the physical computer (physical infrastructure 1005) dynamically and transparently. The hypervisor 1004 affords the ability for multiple operating systems to run concurrently on a single physical computer and share hardware resources with each other. The hypervisor 1004 thus also manages disk I/O scheduling associated with the workloads performed by each virtual machine.

An example of a commercially available hypervisor platform that may be used to implement portions of the cloud infrastructure 1000 in one or more embodiments of the invention is the VMware® vSphere® which may have an associated virtual infrastructure management system such as the VMware® vCenter™. The underlying physical infrastructure 1005 may comprise one or more distributed processing platforms that include storage products such as VNX and Symmetrix® VMAX, both commercially available from EMC Corporation of Hopkinton, Mass. A variety of other storage products may be utilized to implement at least a portion of the cloud infrastructure 1000.

Figure 11:
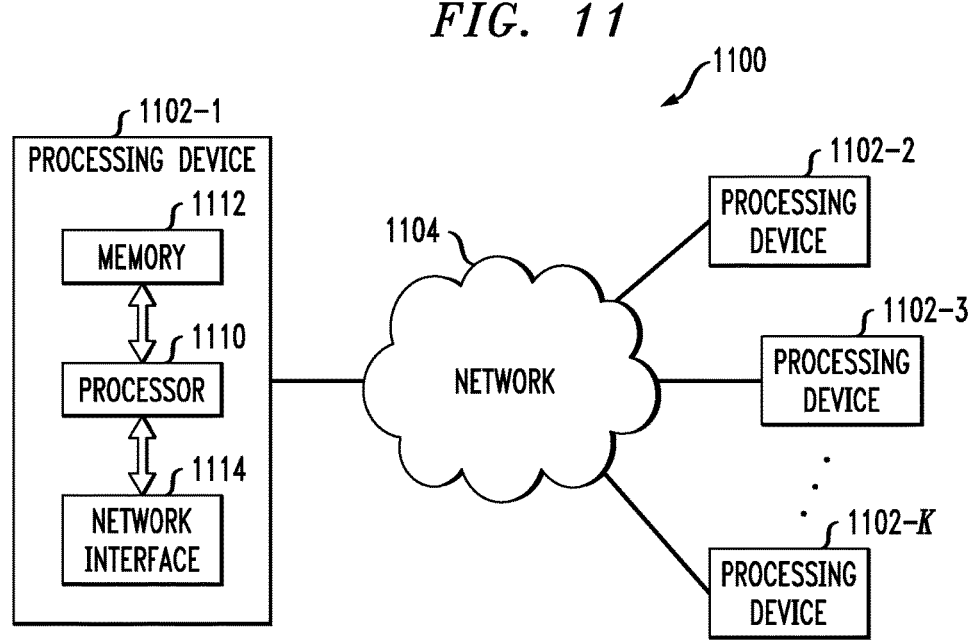

An example of a processing platform on which the cloud infrastructure 1000 and/or the asset configuration and migration management system 140 and configuration and migration engine 142 of FIG. 1 may be implemented is processing platform 1100 shown in FIG. 11. The processing platform 1100 in this embodiment comprises at least a portion of the system 100 and includes a plurality of processing devices denoted 1102-1, 1102-2, 1102-3, . . . 1102-K, which communicate with one another over a network 1104. One or more of the elements of system 100 may therefore each run on one or more computers or other processing platform elements, each of which may be viewed as an example of what is more generally referred to herein as a "processing device." As illustrated in FIG. 11, such a device generally comprises at least one processor 1110 and an associated memory 1112, and implements one or more functional modules for controlling certain features of system 100. Again, multiple elements or modules may be implemented by a single processing device in a given embodiment.

The processing device 1102-1 in the processing platform 1100 comprises a processor 1110 coupled to a memory 1112. The processor 1110 may comprise a microprocessor, a microcontroller, an application-specific integrated circuit (ASIC), a field programmable gate array (FPGA) or other type of processing circuitry, as well as portions or combinations of such circuitry elements.

Components of a computing system as disclosed herein can be implemented at least in part in the form of one or more software programs stored in memory and executed by a processor of a processing device such as processor 1110. Memory 1112 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 1112 may comprise electronic memory such as random access memory (RAM), read-only memory (ROM) or other types of memory, in any combination. The one or more software programs when executed by a processing device such as the processing device 1102-1 causes the device to perform functions associated with one or more of the elements of system 100. One skilled in the art would be readily able to implement such software given the teachings provided herein. Other examples of processor-readable storage media embodying embodiments of the invention may include, for example, optical or magnetic disks.

Processing device 1102-1 also includes network interface circuitry 1114, which is used to interface the server with the network 1104 and other system components. Such circuitry may comprise conventional transceivers of a type well known in the art.

The other processing devices 1102 of the processing platform 1100 are assumed to be configured in a manner similar to that shown for processing device 1102-1 in the figure.

The processing platform 1100 shown in FIG. 11 may comprise additional known components such as batch processing systems, parallel processing systems, physical machines, virtual machines, virtual switches, storage volumes, logical units, etc. Again, the particular processing platform shown in FIG. 11 is presented by way of example only, and system 100 of FIG. 1 may include additional or alternative processing platforms, as well as numerous distinct processing platforms in any combination.

Also, numerous other arrangements of servers, computers, storage devices or other components are possible in system 100. Such components can communicate with other elements of the system 100 over any type of network, such as a wide area network (WAN), a local area network (LAN), a satellite network, a telephone or cable network, a storage network (e.g., FC), a converged network (e.g., FCoE or Infiniband) or various portions or combinations of these and other types of networks.

Advantageously, the embodiments of the present invention automatically model required configuration updates. Embodiments of the present invention simplify the process and reduce the time it takes to plan configuration changes required when a user wants a configuration on a target asset based on existing configurations on the source asset. Also, in accordance with embodiments of the present invention, scripts can be automatically generated to update configurations on source environments, target environments, and other assets/sub-assets where changes are required as a result of the configuration and migration.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:

generating an element representing an event in a storage system migration project;

adding one or more assets to the element;

generating a migration group within the element including a sub-set of the one or more assets from the element; and determining a source asset and a target asset from the one or more assets;

wherein one or more assets in the sub-set are to be configured;

wherein the element comprises an event window used in connection with planning the storage system migration project;

wherein the sub-set of the one or more assets includes the source asset and the target asset grouped together in the migration group to permit a configuration of the source asset and a configuration of the target asset to be managed together, and to permit management of an assignment between at least two assets;

wherein assignments on the target asset are automatically configured based on the configuration of the source asset, a script is automatically generated to update the configuration on at least one of the source asset and the target asset, the one or more assets added to the element further comprise an associated asset that is automatically configured, and the event window displays a time period when the event is occurring; and wherein the generating the element, adding, generating the migration group and determining steps are executed via at least one processor coupled to a memory.

2. The method of claim 1, further comprising automatically configuring at least one of a fabric, zone and port assignment on the target asset based on the configuration of the source asset.

3. The method of claim 1, further comprising automatically configuring at least one of extents from storage volumes, devices from extents, virtual volumes from devices, and storage views on a target virtual storage asset based on the configuration of the source asset.

4. The method of claim 1, further comprising automatically generating a rule to detect at least one of information, a warning and an error condition in a network.

5. The method of claim 1, wherein the associated asset is included in the element and is not included in the sub-set of the one or more assets.

6. The method of claim 1, wherein automatically configuring the associated asset comprises at least one of creating a masking to the associated asset and assigning a connectivity of the associated asset.

7. The method of claim 1, wherein configuring the one or more assets in the sub-set is performed within a single asset, between two assets, between one asset and a plurality of assets, or from a plurality of assets to another plurality of assets.

8. The method of claim 1, wherein the migration group within the element further includes one or more profiles including device information, entity information and migration constraints.

9. A computer program product comprising a non-transitory processor-readable storage medium having encoded therein executable code of one or more software programs, wherein the one or more software programs when executed by the processor device implement the steps of:

generating an element representing an event in a storage system migration project;

adding one or more assets to the element;

generating a migration group within the element including a sub-set of the one or more assets from the element; and determining a source asset and a target asset from the one or more assets;

wherein one or more assets in the sub-set are to be configured;

wherein the element comprises an event window used in connection with planning the storage system migration project;

wherein the sub-set of the one or more assets includes the source asset and the target asset grouped together in the migration group to permit a configuration of the source asset and a configuration of the target asset to be managed together, and to permit management of an assignment between at least two assets; and wherein assignments on the target asset are automatically configured based on the configuration of the source asset, a script is automatically generated to update the configuration on at least one of the source asset and the target asset, the one or more assets added to the element further comprise an associated asset that is automatically configured, and the event window displays a time period when the event is occurring.

10. The computer program product of claim 9, wherein the one or more software programs when executed by the processor device further implement the step of automatically configuring at least one of a fabric, zone and port assignment on the target asset based on the configuration of the source asset.

11. The computer program product of claim 9, wherein the one or more software programs when executed by the processor device further implement the step of automatically configuring at least one of extents from storage volumes, devices from extents, virtual volumes from devices, and storage views on a target virtual storage asset based on the configuration of the source asset.

12. The computer program product of claim 9, wherein the one or more software programs when executed by the processor device further implement the step of automatically generating a rule to detect at least one of information, a warning and an error condition in a network.

13. The computer program product of claim 9, wherein the associated asset is included in the element and is not included in the sub-set of the one or more assets.

14. The computer program product of claim 9, wherein automatically configuring the associated asset comprises at least one of creating a masking to the associated asset and assigning a connectivity of the associated asset.

15. The computer program product of claim 9, wherein configuring the one or more assets in the sub-set is performed within a single asset, between two assets, between one asset and a plurality of assets, or from a plurality of assets to another plurality of assets.

16. The computer program product of claim 9, wherein the migration group within the element further includes one or more profiles including device information, entity information and migration constraints.

17. An apparatus comprising:

a memory; and a processor operatively coupled to the memory and configured to:

generate an element representing an event in a storage system migration project;

add one or more assets to the element; and generate a migration group within the element including a sub-set of the one or more assets from the element; and determine a source asset and a target asset from the one or more assets;

wherein one or more assets in the sub-set are to be configured;

wherein the element comprises an event window used in connection with planning the storage system migration project;

wherein the sub-set of the one or more assets includes the source asset and the target asset grouped together in the migration group to permit a configuration of the source asset and a configuration of the target asset to be managed together, and to permit management of an assignment between at least two assets;

wherein the processor is further operative to automatically configure assignments on the target asset based on the configuration of the source asset, a script is automatically generated to update the configuration on at least one of the source asset and the target asset, the one or more assets added to the element further comprise an associated asset, and the processor is further operative to automatically configure the associated asset; and wherein the event window displays a time period when the event is occurring.

18. The apparatus of claim 17, wherein the associated asset is included in the element and is not included in the sub-set of the one or more assets.

19. The apparatus of claim 17, wherein automatically configuring the associated asset comprises at least one of creating a masking to the associated asset and assigning a connectivity of the associated asset.

20. The apparatus of claim 17, wherein configuring the one or more assets in the sub-set is performed within a single asset, between two assets, between one asset and a plurality of assets, or from a plurality of assets to another plurality of assets.

\* \* \* \* \*